(12) United States Patent
Kobayashi (10) Patent No.: US 8,910,744 B2
(45) Date of Patent: Dec. 16, 2014

(54) SPEAKER UNIT

(75) Inventor: Shinji Kobayashi, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/123,888

(22) PCT Filed: Jun. 15, 2012

(86) PCT No.: PCT/JP2012/065930
§ 371 (c)(1),
(2), (4) Date: Dec. 4, 2013

(87) PCT Pub. No.: WO2013/005578
PCT Pub. Date: Jan. 10, 2013

(65) Prior Publication Data
US 2014/0131134 A1    May 15, 2014

(30) Foreign Application Priority Data

Jul. 1, 2011    (JP) ................................. 2011-147341

(51) Int. Cl.
*A47B 81/06*     (2006.01)
(52) U.S. Cl.
USPC ........................... 181/199; 181/148; 181/150
(58) Field of Classification Search
USPC ......................................... 181/199, 148, 150
See application file for complete search history.

(56) References Cited

U.S. PATENT DOCUMENTS

| | | | | |
|---|---|---|---|---|
| 4,696,369 | A * | 9/1987 | Dodrill | 181/141 |
| 4,924,962 | A * | 5/1990 | Terai et al. | 181/141 |
| 5,170,435 | A * | 12/1992 | Rosen et al. | 381/86 |
| 6,711,275 | B2 * | 3/2004 | Damerow et al. | 381/389 |
| 7,628,249 | B2 * | 12/2009 | Hanna | 181/150 |
| 7,940,939 | B1 * | 5/2011 | Hamilton et al. | 381/86 |
| 8,739,921 | B1 * | 6/2014 | Larson | 181/199 |

FOREIGN PATENT DOCUMENTS

| | | |
|---|---|---|
| JP | 4-15391 U | 2/1992 |
| JP | 4-57462 U | 5/1992 |
| JP | 2006-303577 | 11/2006 |

* cited by examiner

*Primary Examiner* — Forrest M Phillips
(74) *Attorney, Agent, or Firm* — Oblon, Spivak, McClelland, Maier & Neustadt, L.L.P.

(57) ABSTRACT

A frame including an opening, a sound outputting unit arranged inside the frame, and an elastically deformable packing attached to the frame and projecting outward from the frame to be formed into an annular shape are provided, and they are configured to be stored in a tire storage unit including a storage concave portion opening upward in which a spare tire is stored in a state in which the packing is pressed against a rim portion of a wheel below a disk portion of the wheel of the spare tire. According to this, two spaces enclosed by the packing, each portion of the wheel, and the tire storage unit are formed, so that sound may be output from a speaker unit in an excellent manner and it is not required that the speaker unit be removed from the tire storage unit when the spare tire is stored in or removed from the tire storage unit.

6 Claims, 13 Drawing Sheets

FIG. 1

102···TIRE STORAGE UNIT
102a···STORAGE CONCAVE PORTION
106···GROOVE PORTION

FIG. 2

23···CABLE
102···TIRE STORAGE UNIT
102a···STORAGE CONCAVE PORTION
106···GROOVE PORTION
400···SPARE TIRE
500···WHEEL
502···DISK PORTION
600···TIRE TUBE

FIG. 6

10a···OPENING
102···TIRE STORAGE UNIT
102a···STORAGE CONCAVE PORTION
106···GROOVE PORTION

FIG. 7

3···SOUND OUTPUTTING UNIT
4···PACKING
5···FIRST FRAME PORTION
7a···THREADED HOLE (FIXING UNIT)
8a···OPENING
102···TIRE STORAGE UNIT
102a···STORAGE CONCAVE PORTION
106···GROOVE PORTION

23···CABLE
102···TIRE STORAGE UNIT
102a···STORAGE CONCAVE PORTION
106···GROOVE PORTION
400···SPARE TIRE
500···WHEEL
502···DISK PORTION
600···TIRE TUBE

FIG. 10

102···TIRE STORAGE UNIT
102a···STORAGE CONCAVE PORTION
106···GROOVE PORTION
400···SPARE TIRE
500···WHEEL
600···TIRE TUBE

SPEAKER UNIT

TECHNICAL FIELD

This technology relates to a technical field of a speaker unit. Specifically, this relates to the technical field of storing the speaker unit and a spare tire in a tire storage unit without a trouble in handling the spare tire and outputting sound while storing them in the tire storage unit in a state in which an elastically deformable packing is pressed against a rim portion of a wheel below a disk portion of the wheel.

BACKGROUND ART

There is a speaker unit stored in a tire storage unit formed in a vehicle to be used (for example, refer to Patent Documents 1 and 2).

Such speaker unit is often used as a unit referred to as a woofer which outputs low-register sound.

The speaker unit disclosed in Patent Document 1 is stored in the tire storage unit from which a spare tire is removed, and the speaker unit is stored in an appropriate state regardless of a size of the tire storage unit through adjustment of an amount of air filled in an air sac inflated by filled air.

The speaker unit disclosed in Patent Document 2 is stored in a space opening upward formed on a central portion of the spare tire stored in the tire storage unit.

CITATION LIST

Patent Documents

Patent Document 1: Japanese Patent Application Laid-Open No. 2010-34984
Patent Document 2: Japanese Patent No. 4587866

SUMMARY OF THE INVENTION

Problems to be Solved by the Invention

However, the speaker unit disclosed in Patent Document 1 may be stored only in a state in which the spare tire is removed from the tire storage unit. Therefore, when the speaker unit is stored in the tire storage unit, the tire storage unit originally formed for storing the spare tire cannot be used as the space for storing the spare tire.

The speaker unit disclosed in Patent Document 2 is stored above a disk portion of a wheel in a state in which the spare tire is stored in the tire storage unit. Therefore, it is required to temporarily remove the speaker unit from the tire storage unit each time the spare tire is stored in and removed from the tire storage unit, so that there is a trouble in handling the spare tire with the tire storage unit.

Therefore, an object of the speaker unit of this technology is to overcome the above-described problem to store the speaker unit and the spare tire in the tire storage unit without the trouble in handling the spare tire and outputting the sound.

Solution to Problems

First, in order to solve the above-described problem, a speaker unit is provided with a frame including an opening, a sound outputting unit arranged inside the frame, and an elastically deformable packing attached to the frame and projecting outward from the frame to be formed into an annular shape, and is configured to be stored in a tire storage unit including a storage concave portion opening upward in which a spare tire is stored in a state in which the packing is pressed against a rim portion of a wheel below a disk portion of the wheel of the spare tire.

Therefore, the speaker unit is such that the storage concave portion of the tire storage unit is separated into upper and lower sides of the packing.

Second, in the above-described speaker unit, it is desirable that the spare tire is configured to be stored in the tire storage unit in a state in which the disk portion of the wheel is located above a center in an axial direction of a tire tube.

The spare tire is configured to be stored in the tire storage unit in the state in which the disk portion of the wheel is located above the center in the axial direction of the tire tube, so that a large space inside the tire tube may be used as a storage space of the speaker unit.

Third, in the above-described speaker unit, it is desirable that the frame is formed of a first frame portion attached to the tire storage unit and a second frame portion located on a side opposite to the first frame portion in a vertical direction across the packing.

By forming the frame of the first frame portion attached to the tire storage unit and the second frame portion located on the side opposite to the first frame portion in the vertical direction across the packing, it becomes possible to separate the first frame portion from the second frame portion and mount one of the frame portions on the tire storage unit.

Fourth, in the above-described speaker unit, it is desirable that a fixing unit to fix the spare tire is provided on the frame.

By providing the fixing unit to fix the spare tire on the frame, the spare tire is fixed to the speaker unit regardless of sizes of the speaker unit and the spare tire relative to the tire storage unit.

Fifth, in the above-described speaker unit, it is desirable that a cable for energizing the sound outputting unit is connected, and the cable is inserted through the opening to be arranged along an inner surface of the tire storage unit.

The cable for energizing the sound outputting unit is connected and the cable is inserted through the opening to be arranged along the inner surface of the tire storage unit, so that the cable does not interfere with the spare tire when the spare tire is stored in or removed from the tire storage unit.

Sixth, in the above-described speaker unit, it is desirable that a groove portion is formed on the tire storage unit, and the cable is arranged in the groove portion.

Since the groove portion is formed on the tire storage unit and the cable is arranged in the groove portion, the cable is not crushed by the spare tire when the spare tire is stored in the tire storage unit.

Effects of the Invention

A speaker unit of this technology is provided with a frame including an opening, a sound outputting unit arranged inside the frame, and an elastically deformable packing attached to the frame and projecting outward from the frame to be formed into an annular shape, and is configured to be stored in a tire storage unit including a storage concave portion opening upward in which a spare tire is stored in a state in which the packing is pressed against a rim portion of a wheel below a disk portion of the wheel of the spare tire.

Therefore, the storage concave portion is vertically separated by the packing and a part of the wheel and it is not required to remove the speaker unit from the tire storage unit when the spare tire is stored in or removed from the tire storage unit, so that it is possible to store the speaker unit and the spare tire in the tire storage unit without a trouble in handling the spare tire and outputting sound.

In the technology recited in claim 2, the spare tire is configured to be stored in the tire storage unit in a state in which the disk portion of the wheel is located above a center in an axial direction of a tire tube.

Therefore, the spare tire may be inserted into a deep side of the tire storage unit to be stored and the spare tire is not easily projected upward from the tire storage unit, so that it is possible to ensure an excellent storage state of the speaker unit and the spare tire by effective use of a space.

In the technology recited in claim 3, the frame is formed of a first frame portion attached to the tire storage unit and a second frame portion located on a side opposite to the first frame portion in a vertical direction across the packing.

Therefore, it is possible to couple one frame portion and the other frame portion to each other in a state in which one frame portion is mounted on the tire storage unit to be fixed, and storing operation of the speaker unit in the tire storage unit may be easily performed.

In the technology recited in claim 4, a fixing unit to fix the spare tire is provided on the frame.

Therefore, it is possible to store the speaker unit and the spare tire in the tire storage unit in a stable state regardless of sizes of both relative to the tire storage unit.

In the technology recited in claim 5, a cable for energizing the sound outputting unit is connected, and the cable is inserted through the opening to be arranged along an inner surface of the tire storage unit.

Therefore, the cable does not interfere with the spare tire when the spare tire is stored in or removed from the tire storage unit, so that the spare tire may be smoothly stored in and removed from the tire storage unit and disconnection of the cable may be prevented.

In the technology recited in claim 6, a groove portion is formed on the tire storage unit, and the cable is arranged in the groove portion.

Therefore, the cable is not crushed by the spare tire and the disconnection and the like of the cable does not occur, so that reliability of operation of the speaker unit may be improved.

MODE FOR CARRYING OUT THE INVENTION

A best mode for carrying out a speaker unit of this technology is hereinafter described with reference to the attached drawings.

Structure of Tire Storage Unit in which Speaker Unit and Spare Tire are Stored

Figure 1:
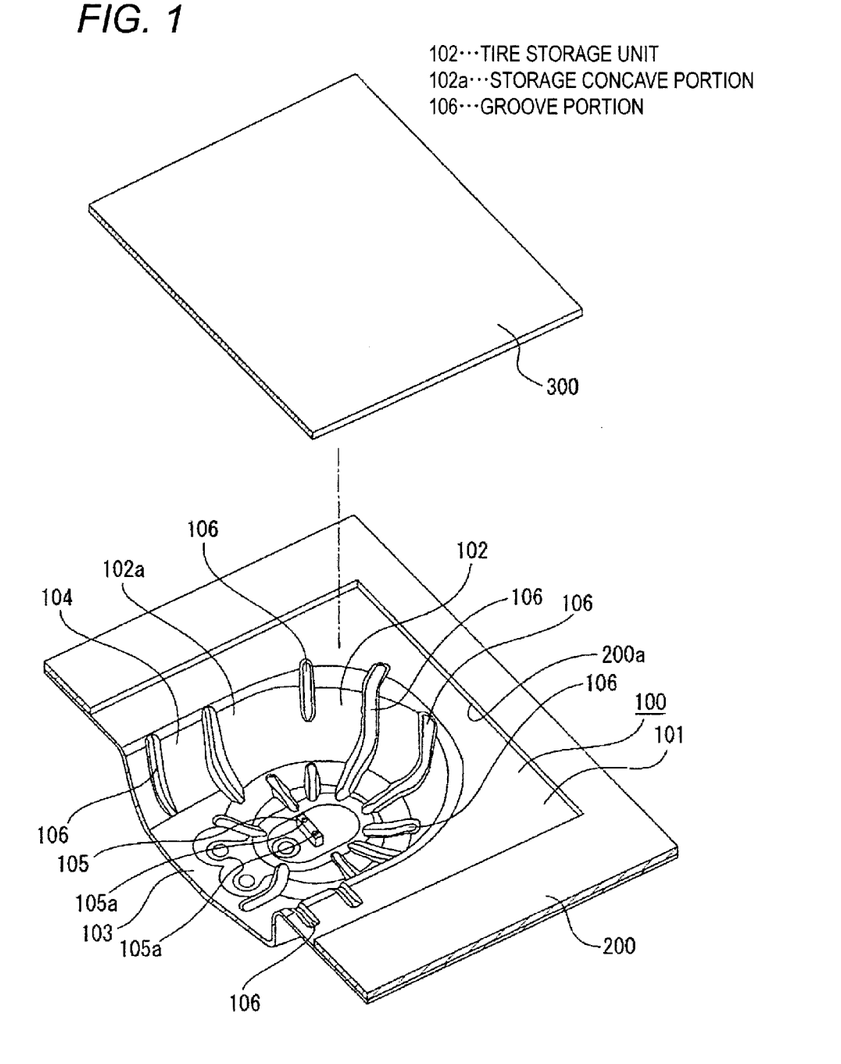
FIG. 1 illustrates an embodiment of a speaker unit of this technology together with FIGS. 2 to 13, and this is a perspective view of a tire storage unit in which the speaker unit and a spare tire are stored.

A vehicle body 100 of a vehicle includes a base surface portion 101 facing in a vertical direction and a tire storage unit 102 continuous from the base surface portion 101 in a trunk room (refer to FIG. 1). The tire storage unit 102 is formed into a concave shape opening upward and a concave portion of the tire storage unit 102 is formed as a storage concave portion 102a. The tire storage unit 102 is formed of a bottom surface portion 103 facing in the vertical direction and a peripheral surface portion 104 projecting upward from an outer peripheral portion of the bottom surface portion 103.

An attaching projection 105 projecting upward is provided on the bottom surface portion 103 of the tire storage unit 102. Screw holes 105a and 105a opening upward are formed on the attaching projection 105.

A plurality of groove portions 106, 106, and so on is formed on the bottom surface portion 103 and a position extending from the bottom surface portion 103 to the peripheral surface portion 104 of the tire storage unit 102. The groove portions 106, 106, and so on opening upward or inward are formed so as to radially extend relative to a central portion of the bottom surface portion 103.

A sheet 200 is arranged on a part of an upper surface of the base surface portion 101 and an opening 200a for exposing the tire storage unit 102 is formed on the sheet 200.

The tire storage unit 102 is blocked by a cover 300 covering the opening 200a of the sheet 200.

Structure of Spare Tire

Figure 2:
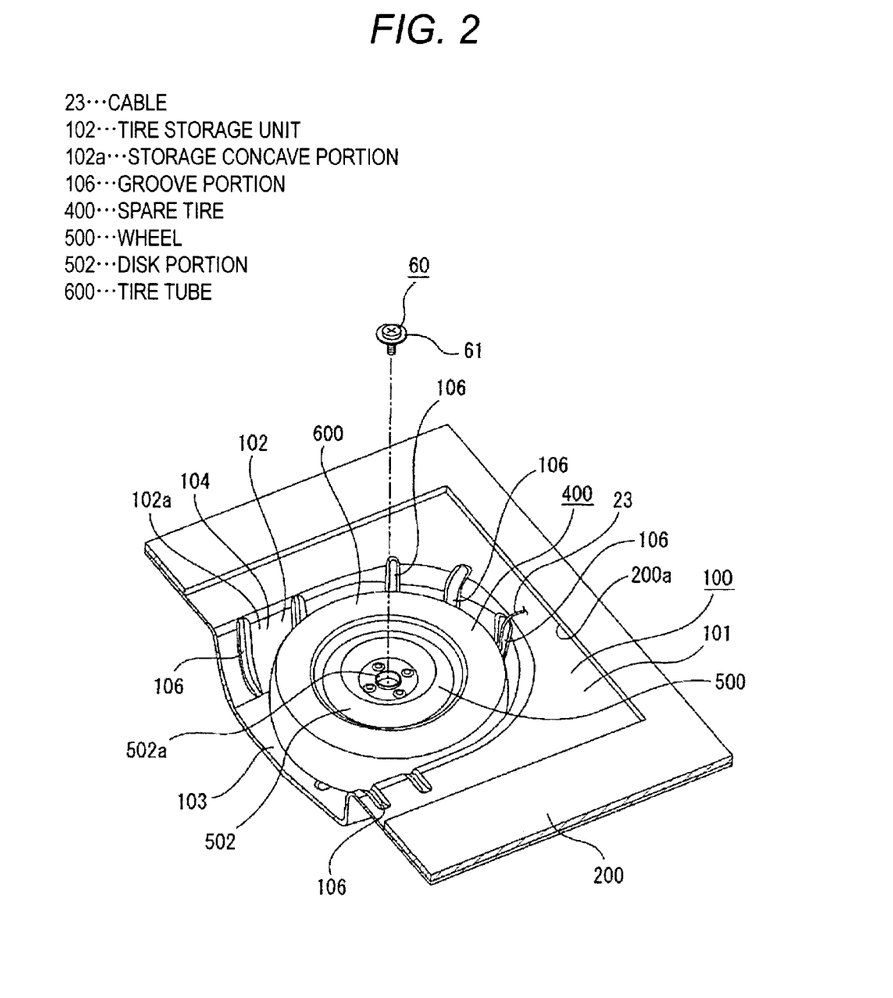
FIG. 2 is a perspective view of a state in which the spare tire is stored in the tire storage unit.
Figure 3:
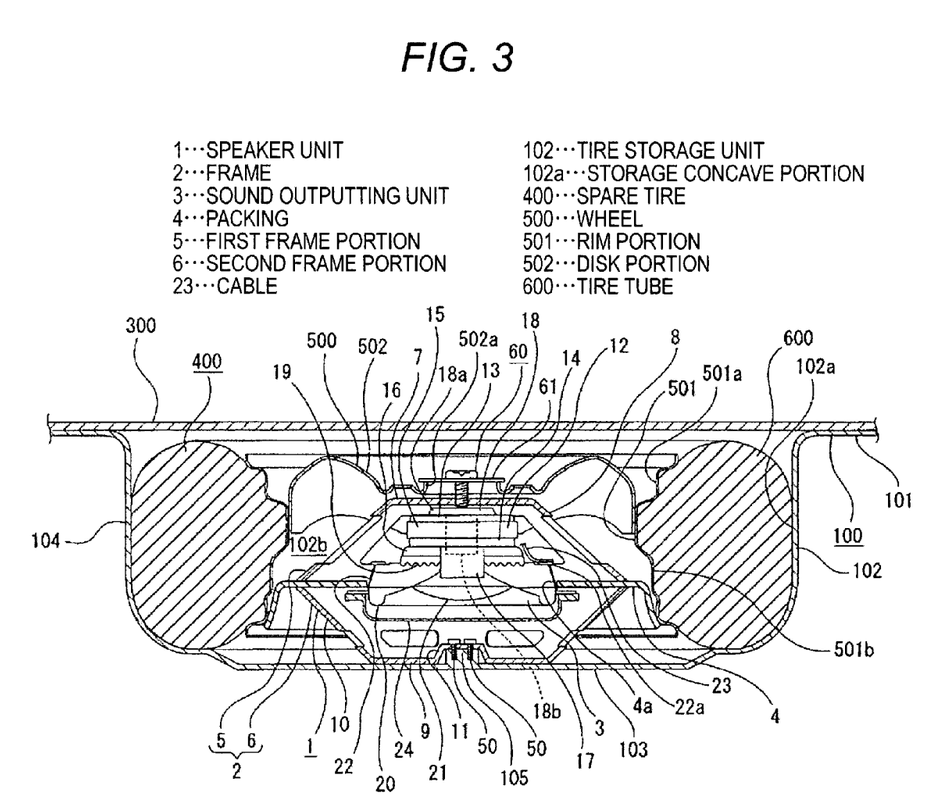
FIG. 3 is an enlarged cross-sectional view of a state in which the speaker unit and the spare tire are stored in the tire storage unit.

A spare tire 400 is stored in the tire storage unit 102 (refer to FIGS. 2 and 3).

A tire tube 600 is coupled to an outer periphery of a wheel 500 to obtain the spare tire 400. The wheel 500 is formed of a rim portion 501 to which the tire tube 600 is coupled and a disk portion 502 located inside the rim portion 501. The disk portion 502 is attached to the rim portion 501 by welding and the like, for example. Meanwhile, the disk portion 502 may also be integrally formed with the rim portion 501.

The rim portion 501 includes a first coupling portion 501a and a second coupling portion 501b located on opposite sides across a portion to which the disk portion 502 is coupled. The second coupling portion 501b has a larger width in the vertical direction than that of the first coupling portion 501a.

The disk portion 502 is located so as to be closer to one side in an axial direction with respect to the tire tube 600. An insertion hole 502a is formed on a central portion of the disk portion 502 so as to penetrate the same in the vertical direction.

The spare tire 400 is stored in the tire storage unit 102 in a state in which the disk portion 502 is located above a center in the axial direction of the tire tube 600, for example. Therefore, in a state in which the spare tire 400 is stored in the tire storage unit 102, a large arrangement space 102b enclosed by the disk portion 502 and the second coupling portion 501b of the wheel 500 and the bottom surface portion 103 is formed in the tire storage unit 102.

Configuration of Speaker Unit

In addition to the spare tire 400, a speaker unit 1 is stored in the tire storage unit 102 (refer to FIG. 3). The speaker unit 1 has a function to output sound output from a sound signal outputting unit such as a disc player arranged in the vehicle through an amplifier, for example. The sound output from the sound signal outputting unit is amplified by the amplifier to be output from the speaker unit 1. The sound output from the speaker unit 1 is low-register sound, for example.

Figure 4:
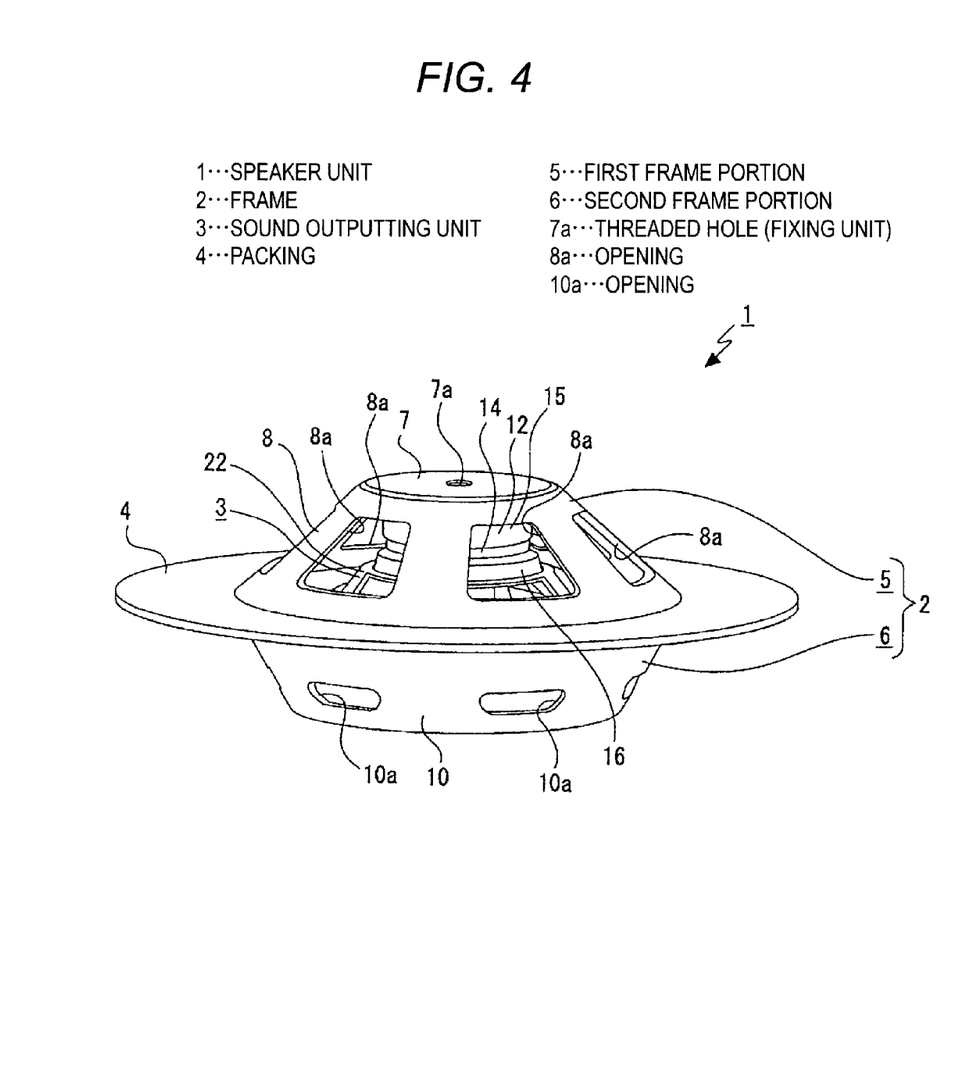
FIG. 4 is a perspective view of the speaker unit.
Figure 5:
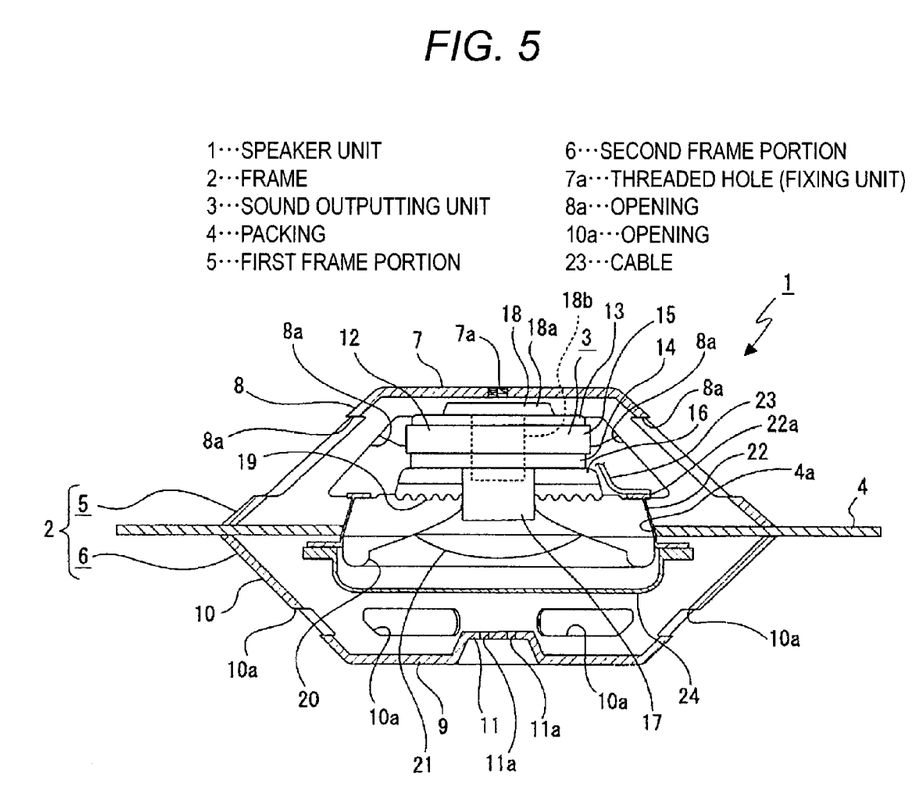
FIG. 5 is a cross-sectional view of the speaker unit.

The speaker unit 1 is formed of a frame 2, a sound outputting unit 3, and a packing 4 (refer to FIGS. 4 and 5).

The frame 2 is formed of a first frame portion 5 and a second frame portion 6.

The first frame portion 5 located above the second frame portion 6, for example, is obtained by integrally forming a substantially disk-shaped base plate portion 7 facing in the vertical direction and a peripheral surface portion 8 projecting from an outer peripheral edge of the base plate portion 7 whose diameter increases toward a lower side.

A threaded hole 7a is formed on a central portion of the base plate portion 7. Openings 8a, 8a, and so on are formed on the peripheral surface portion 8 so as to be spaced apart in a circumferential direction.

The second frame portion 6 located below the first frame portion 5 across the packing 4, for example, is obtained by integrally forming a substantially disk-shaped basal plate portion 9 facing in the vertical direction and a peripheral plate portion 10 projecting from an outer peripheral edge of the basal plate portion 9 whose diameter increases toward an upper side.

An attached projection 11 projecting upward is provided on a central portion of the basal plate portion 9 and screw insertion holes 11a and 11a are formed on the attached projection 11 so as to penetrate the same in the vertical direction. Openings 10a, 10a, and so on are formed on the peripheral plate portion 10 so as to be spaced apart in a circumferential direction.

The sound outputting unit 3 is arranged inside the frame 2.

The sound outputting unit 3 includes a base body 12 and the base body 12 includes annularly formed first magnet 13 and second magnet 14, an annular plate 15, and a substantially annular sub plate 16.

The first magnet 13 and the second magnet 14 are located so as to be spaced apart in the vertical direction. The plate 15 is arranged between the first magnet 13 and the second magnet 14 and the sub plate 16 is arranged on a side opposite to the plate 15 across the second magnet 14. The first magnet 13, the second magnet 14, the plate 15, and the sub plate 16 are coupled together such that central axes thereof coincide with one another.

A coil bobbin 17 is inserted into the base body 12 to be arranged and a part of the coil bobbin 17 projects downward from the base body 12. A coil not illustrated is wound around a part of an outer peripheral surface of the coil bobbin 17.

A yoke 18 is attached to the base body 12. The yoke 18 is formed of a substantially disk-shaped base surface portion 18a and an inserted arrangement portion 18b projecting in an axial direction of the base surface portion 18a from a central portion of the base surface portion 18a, the inserted arrangement portion 18b formed into a substantially cylindrical shape.

The base surface portion 18a of the yoke 18 is fixed to the base body 12 and a part of the inserted arrangement portion 18b thereof is inserted into the coil bobbin 17.

A damper 19 is attached to an intermediate portion in an axial direction of the coil bobbin 17. The damper 19 is formed into a thin substantially annular shape to be elastically deformable with an inner peripheral portion attached to the outer peripheral surface of the coil bobbin 17. The damper 19 has a function to be elastically deformed when a driving current is supplied to the coil and the coil bobbin 17 is moved in the axial direction, thereby inhibiting excessive movement of the coil bobbin 17 in the axial direction.

A cone 20 is attached to one end in the axial direction of the coil bobbin 17. A cap 21 is attached to a central portion of the cone 20.

A holding member 22 is arranged inside the frame 2 and the cone 20 is held by the holding member 22. A terminal 22a is provided on an outer peripheral portion of the holding member 22. One end of a cable 23 is connected to the terminal 22a, the cable 23 is derived out of the opening 8a formed on the first frame portion 5 of the frame 2, and the other end thereof is connected to a driver circuit which supplies the driving current to the coil.

A protecting cover 24 for protecting the cone 20 is arranged inside the frame 2.

The packing 4 is formed of an elastically deformable material such as rubber and elastomer, for example, to be arranged between the first frame portion 5 and the second frame portion 6. The packing 4 is formed to have a thin annular shape with a portion on an outer peripheral side projecting outward from the frame 2. A central hole of the packing 4 is formed as an arrangement hole 4a and the sound outputting unit 3 is inserted into the arrangement hole 4a to be arranged.

Mounting and the Like of Speaker Unit and the Like to Tire Storage Unit

A procedure for mounting/storing the above-described speaker unit 1 and spear tire 400 on/in the tire storage unit 102 is hereinafter described (refer to FIGS. 6 to 10).

The speaker unit 1 is first mounted on the tire storage unit 102 in a following manner.

Figure 6:
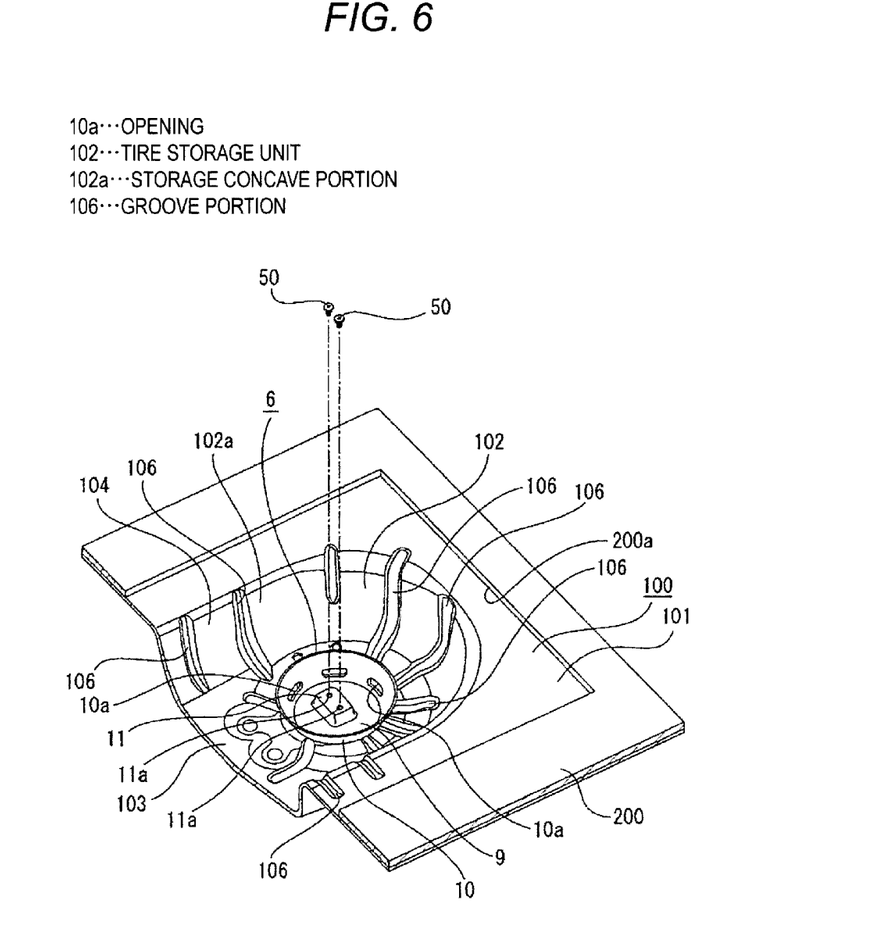
FIG. 6 illustrates a mounting procedure when the speaker unit and the spare tire are stored in the tire storage unit together with FIGS. 7 to 10, and this is a perspective view of a state in which a second frame portion is arranged in the tire storage unit.

In order to mount the speaker unit 1 on the tire storage unit 102, the second frame portion 6 is first arranged on the bottom surface portion 103 of the tire storage unit 102 as illustrated in FIG. 6.

Next, attaching screws 50 and 50 are inserted into the screw insertion holes 11a and 11a formed on the attached projection 11 of the second frame portion 6 to be screwed into the screw holes 105a and 105a of the attaching projection 105, thereby fixing the second frame portion 6 to the bottom surface portion 103. At that time, the second frame portion 6 is formed to have a shape opening upward, so that screwing operation of the second frame portion 6 to the tire storage unit 102 may be easily performed.

Figure 7:
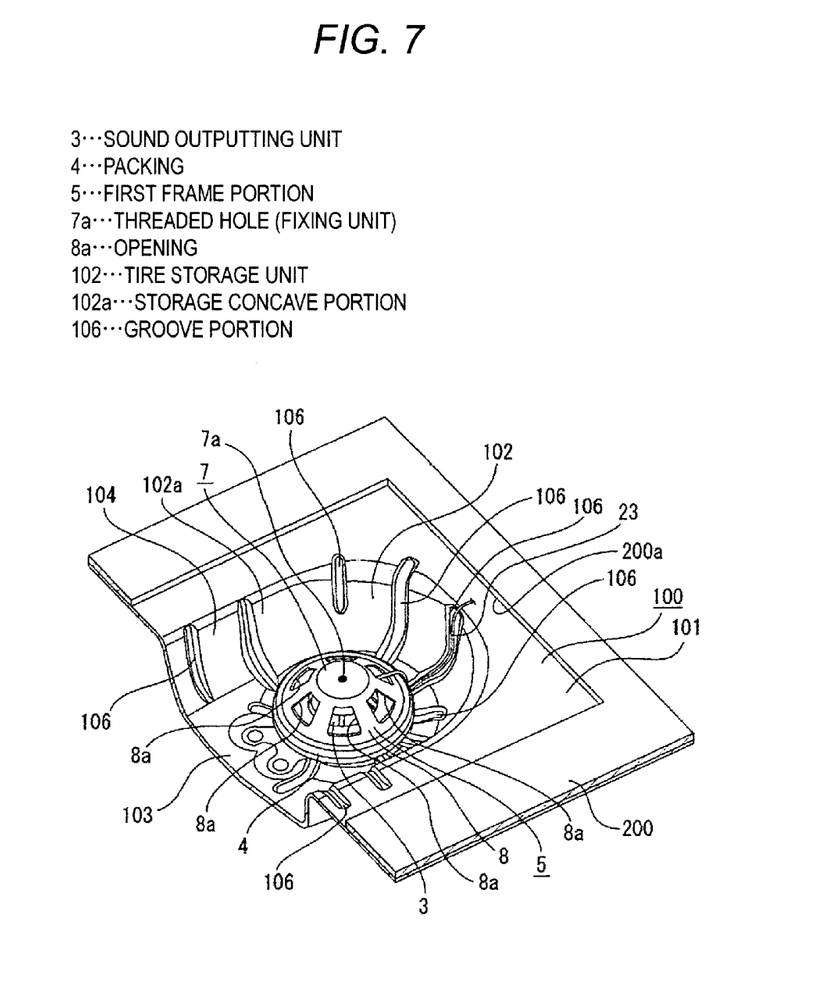
FIG. 7 is a perspective view of a state in which a first frame portion and the like is mounted on the second frame portion arranged in the tire storage unit.

Next, the first frame portion 5 to which the sound outputting unit 3 and the packing 4 are coupled is mounted on the second frame portion 6 from above and storage of the speaker unit 1 in the tire storage unit 102 is completed (refer to FIG. 7). The first frame portion 5 is mounted on the second frame portion 6 with alignment such that an upper end of the second frame portion 6 and a lower end of the first frame portion 5 vertically fit to each other. At that time, it is also possible that a positioning unit for positioning the first frame portion 5 and the second frame portion 6, and a coupling unit, an engaging unit and the like formed of a pin and a hole for coupling both portions are provided on the first frame portion 5 and the second frame portion 6.

As described above, since the frame 2 is formed of the first frame portion 5 and the second frame portion 6, it is possible to separate the second frame portion 6 from the first frame portion 5 and mount the same on the tire storage unit 102.

Therefore, it is possible to couple the first frame portion 5 to the second frame portion 6 in a state in which the second frame portion 6 is mounted on the tire storage unit 102 to be fixed thereto, so that mounting operation of the speaker unit 1 on the tire storage unit 102 may be easily performed.

When the first frame portion 5 is mounted on the second frame portion 6, the cable 23 is derived out of the opening 8a of the first frame portion 5, and the cable 23 is arranged along an inner surface of the tire storage unit 102 to be inserted into the groove portion 106 formed on the position extending from the bottom surface portion 103 to the peripheral surface portion 104.

Next, the spare tire 400 is stored in the tire storage unit 102 in a following manner.

Figure 8:
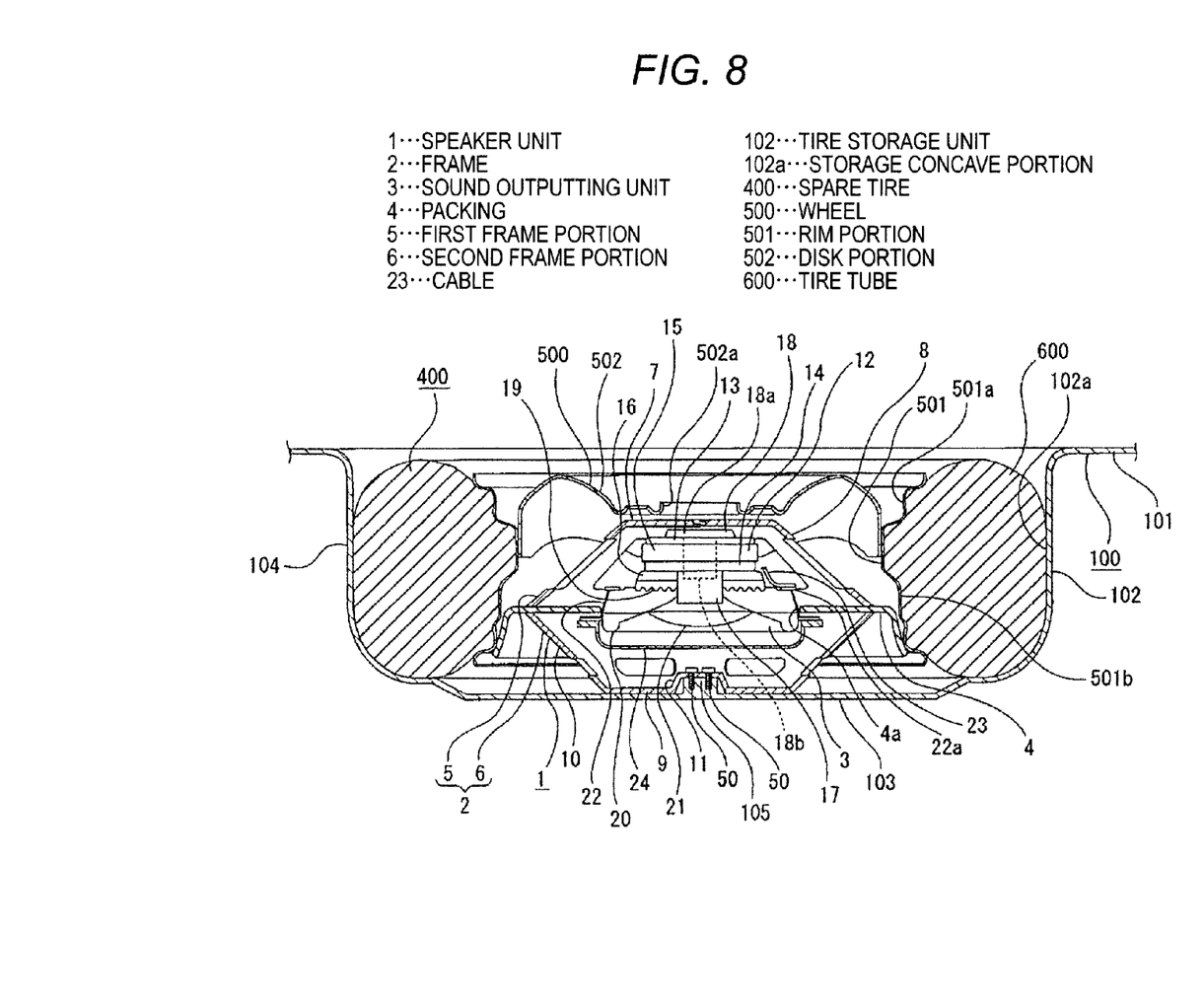
FIG. 8 is a cross-sectional view of a state in which the spare tire is stored in the tire storage unit in a state in which the speaker unit is stored in the tire storage unit.

The spare tire 400 is stored in the tire storage unit 102 in a state in which the disk portion 502 is located above the center in the axial direction of the tire tube 600, for example (refer to FIG. 8). The spare tire 400 is stored in the tire storage unit 102 such that the central portion of the disk portion 502 is located immediately above the central portion of the base plate portion 7 of the first frame portion 5. At that time, the spare tire 400 is in a state in which the tire tube 600 is in contact with the bottom surface portion 103 of the tire storage unit 102.

The spare tire 400 is stored in the tire storage unit 102 in a state in which the disk portion 502 is located above the center in the axial direction of the tire tube 600 as described above, so that a large space inside the tire tube 600 may be used as a storage space of the speaker unit 1.

Therefore, the spare tire 400 may be inserted into a deep side (lower side) of the tire storage unit 102 to be stored and the spare tire 400 is not easily projected upward from the tire storage unit 102, so that an excellent storage state of the speaker unit 1 and the spare tire 400 may be ensured by effective use of the space.

When the spare tire 400 is stored in the tire storage unit 102, the second coupling portion 501b of the rim portion 501 of the wheel 500 is brought into contact with an outer peripheral portion of the packing 4 of the speaker unit 1 from above and the packing 4 is elastically deformed so as to conform to a shape of the second coupling portion 501b to be closely adhered to the second coupling portion 501b.

Therefore, the storage concave portion 102a is vertically separated by the packing 4 and the second coupling portion 501b and upper and lower two spaces are formed inside the tire tube 600 across the packing 4. The upper space is enclosed by the packing 4, the rim portion 501 and the disk portion 502 of the wheel 500, or the cover 300, and the lower space is enclosed by the packing 4, the rim portion 501 of the wheel 500, and the bottom surface portion 103 of the tire storage unit 102.

Figure 9:
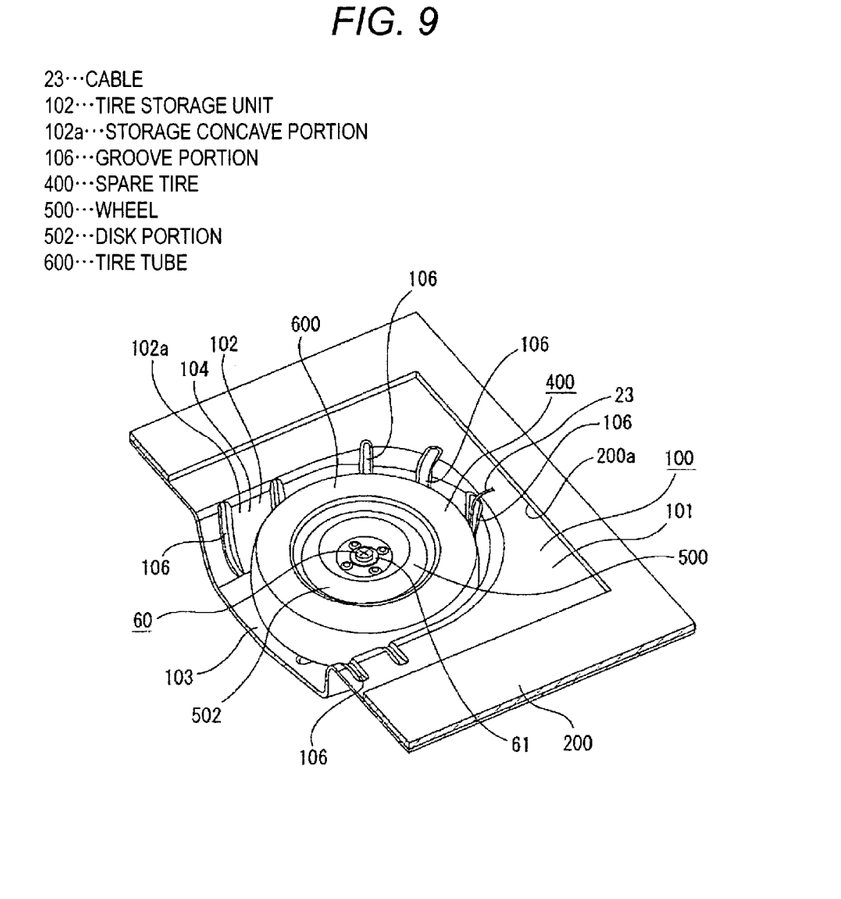
FIG. 9 is a perspective view of a state in which the spare tire stored in the tire storage unit is fixed to the speaker unit.

Subsequently, as illustrated in FIG. 9, a screw with flange 60 is inserted into the insertion hole 502a formed on the disk portion 502 of the wheel 500 to be screwed into the threaded hole 7a formed on the base plate portion 7 of the first frame portion 5 and the spare tire 400 is fixed to the speaker unit 1.

At that time, the disk portion 502 is held by a flange 61 of the screw with flange 60 and a stable storage state of the spare tire 400 in the tire storage unit 102 is realized.

In this manner, the threaded hole 7a of the first frame portion 5 serves as a fixing unit to fix the spare tire 400 and it is possible to store the speaker unit 1 and the spare tire 400 in the tire storage unit 102 in a stable state regardless of sizes of both relative to the tire storage unit 102 by providing the fixing unit to fix the spare tire 400 on the speaker unit 1.

Meanwhile, it is also possible that the fixing unit to fix the spare tire 400 is not provided on the speaker unit 1 and the fixing unit to fix the spare tire 400 is provided on the tire storage unit 102.

Also, in the state in which the spare tire 400 is stored in the tire storage unit 102, the cable 23 is arranged in the groove portion 106 as described above, so that the cable 23 is not crushed by the spare tire 400, disconnection and the like of the cable 23 does not occur, and reliability of operation of the speaker unit 1 may be improved.

Figure 10:
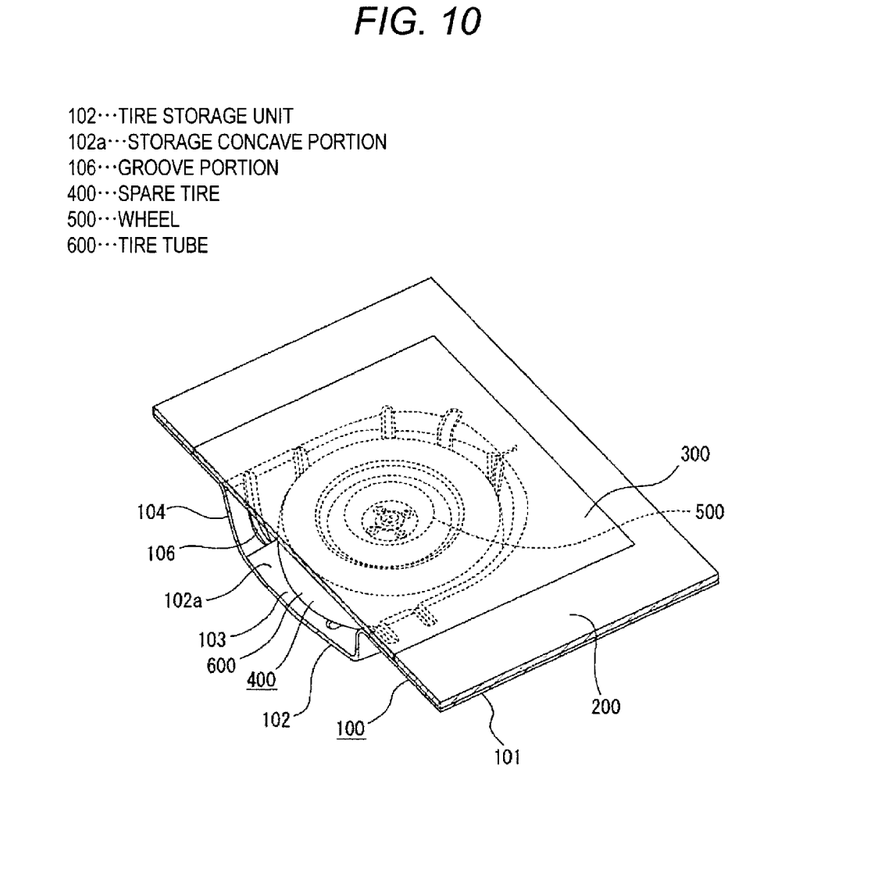
FIG. 10 is a perspective view of a state in which a cover is arranged in a state in which the speaker unit and the spare tire are stored in the tire storage unit.

Finally, the opening 200a of the sheet 200 is covered with the cover 300 to complete the storage of the spare tire 400 in the tire storage unit 102 (refer to FIG. 10).

Operation of Speaker Unit

In the speaker unit 1 configured in the above-described manner, when the driving current is supplied to the coil wound around the coil bobbin 17, the coil bobbin 17 moves in the vertical direction (axial direction) and the cone 20 vibrates along with the movement of the coil bobbin 17 to output sound.

At that time, for example, the sound is transmitted by vibration of the vehicle body 100 and high-quality low-register sound is output in the vehicle. Meanwhile, the sound may also be transmitted in the vehicle through the groove portions 106, 106, and so on formed below the spare tire 400.

Others

Figure 11:
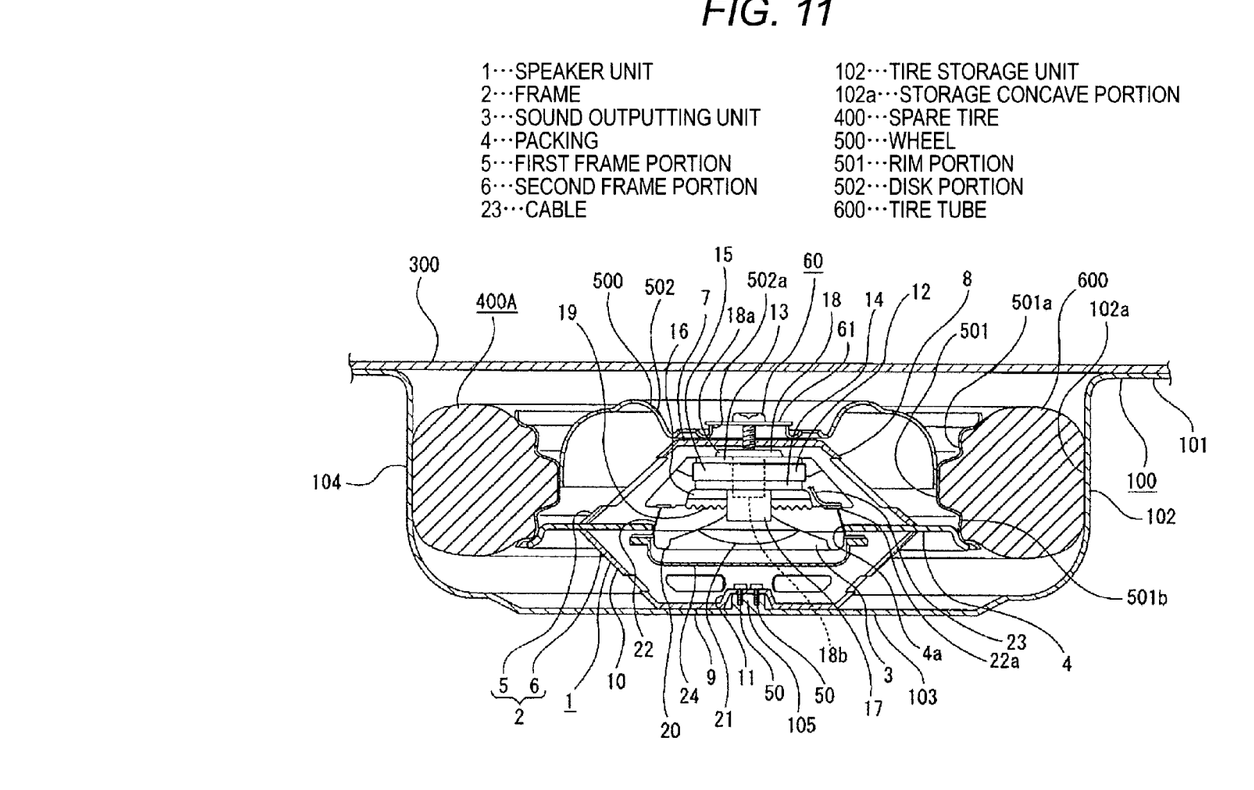
FIG. 11 is a cross-sectional view of a state in which a spare tire whose size in an axial direction is small is stored in the tire storage unit.

Although an example in which the tire tube 600 is in contact with the bottom surface portion 103 of the tire storage unit 102 in the state in which the spare tire 400 is stored is described above, for example, when a spare tire 400A having a small size in an axial direction is stored in the tire storage unit 102 as illustrated in FIG. 11, there is a case in which the tire tube 600 is not in contact with the bottom surface portion 103 of the tire storage unit 102.

In this case also, the second coupling portion 501b of the rim portion 501 of the wheel 500 is brought into contact with the outer peripheral portion of the packing 4 of the speaker unit 1 from above and the packing 4 is elastically deformed so as to conform to the shape of the second coupling portion 501b to be closely adhered to the second coupling portion 501b.

Therefore, the storage concave portion 102a is vertically separated by the packing 4 and the second coupling portion 501b and the upper and lower two spaces are formed inside the tire tube 600 across the packing 4.

The spare tire 400A is fixed to the speaker unit 1 by means of the screw with flange 60 and is stored in the tire storage unit 102 in a stable state.

Further, in the state in which the spare tire 400A is stored in the tire storage unit 102, a space is formed below the spare tire 400A in the storage concave portion 102a and it is possible to use this space as a space in which the sound output from the speaker unit 1 is transmitted.

Storage Direction of Speaker Unit

Figure 12:
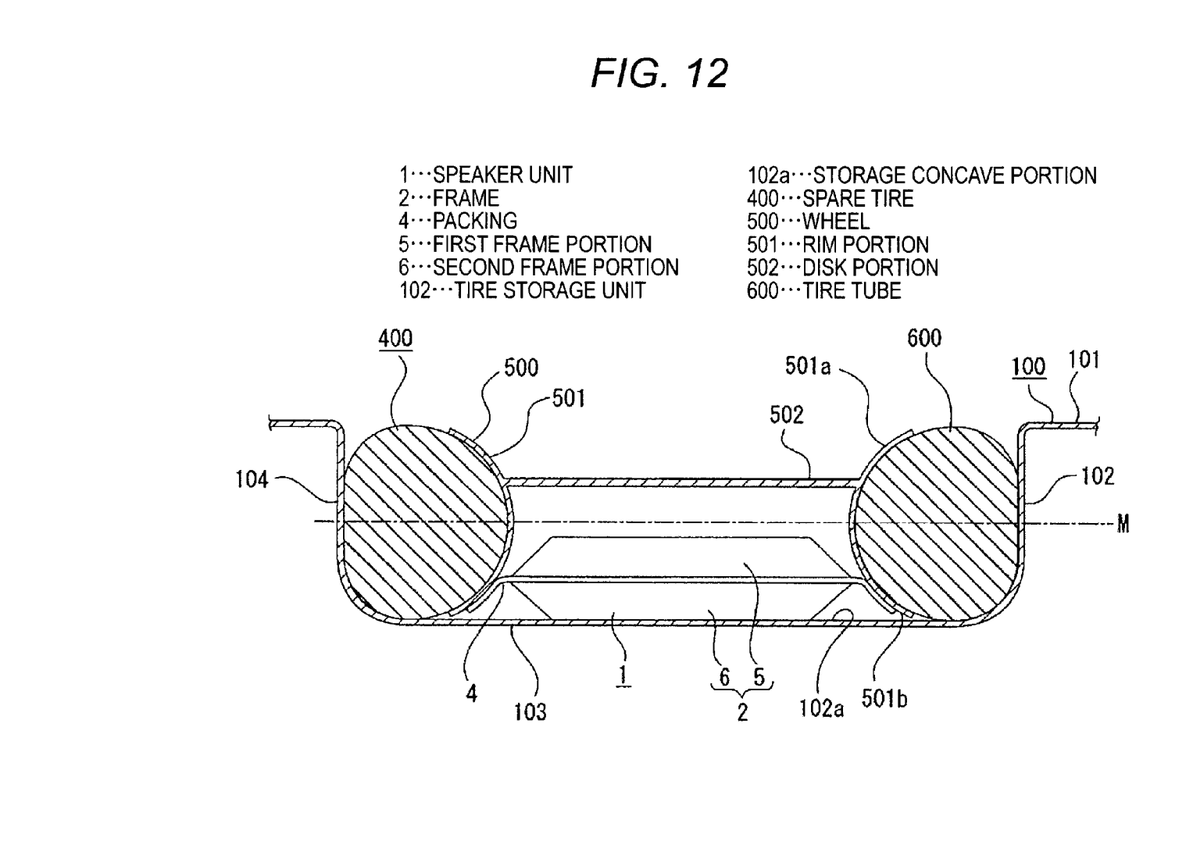
FIG. 12 is a schematic diagram of a state in which the spare tire is stored in the tire storage unit in a state in which a disk portion of a wheel is positioned above a center in an axial direction of a tire tube.

An example in which it is stored in the tire storage unit 102 in a state in which the disk portion 502 of the wheel 500 is located above a center M in the axial direction of the tire tube 600 is described above (refer to FIGS. 8 and 12).

Figure 13:
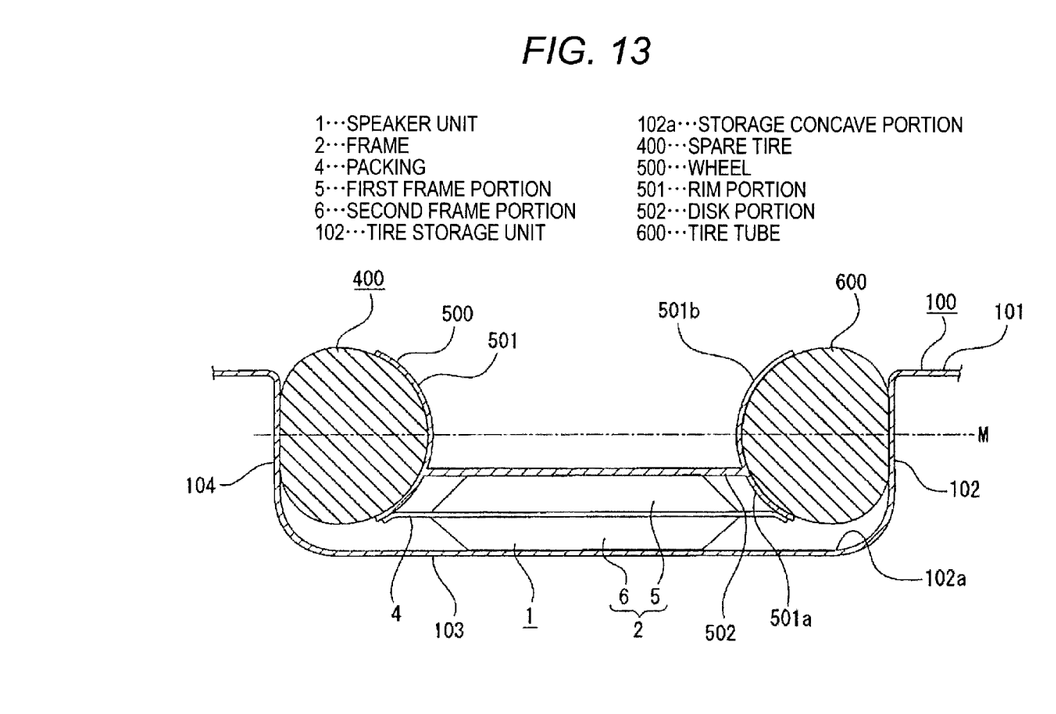
FIG. 13 is a schematic diagram of a state in which the spare tire is stored in the tire storage unit in a state in which the disk portion of the wheel is located below the center in the axial direction of the tire tube.

However, the spare tire 400 may also be stored in the tire storage unit 102 in a state in which the disk portion 502 of the wheel 500 is located below the center M in the axial direction of the tire tube 600 (refer to FIG. 13). When the spare tire 400 is stored in the tire storage unit 102 in such a direction, the first coupling portion 501*a* of the rim portion 501 is brought into contact with the outer peripheral portion of the packing 4 of the speaker unit 1 from above and the packing 4 is elastically deformed to conform to a shape of the first coupling portion 501*a* to be closely adhered to the first coupling portion 501*a*.

Therefore, the storage concave portion 102*a* is vertically separated by the packing 4 and the first coupling portion 501*a* and the upper and lower two spaces are formed inside the tire tube 600 across the packing 4.

CONCLUSION

As described above, the frame 2, the sound outputting unit 3, and the elastically deformable packing 4 are provided on the speaker unit 1, and this is stored in the tire storage unit 102 including the storage concave portion 102*a* in a state in which the packing 4 is pressed against the rim portion 501 of the wheel 500 below the disk portion 502 of the wheel 500.

Therefore, the storage concave portion 102*a* is vertically separated by the packing 4 and a part of the rim portion 501, the two spaces enclosed by the packing 4, each portion of the wheel 500, and a part of the tire storage unit 102 are formed, and the two spaces serve as spaces in which sound energy in opposite phases is output, so that sound may be output from the speaker unit 1 in an excellent manner.

It is also possible to store the spare tire 400 in the tire storage unit 102 in a state in which the speaker unit 1 is stored in the tire storage unit 102.

Therefore, it is not required to remove one of the speaker unit 1 and the spare tire 400 from the tire storage unit 102 and store only the other, so that the spare tire 400 and the speaker unit 1 may be stored together in the tire storage unit 102.

Further, since the speaker unit 1 is stored in the tire storage unit 102 below the disk portion 502 of the wheel 500, it is not required to temporarily remove the speaker unit 1 from the tire storage unit 102 when the spare tire 400 is stored in or removed from the tire storage unit 102.

Therefore, it is possible to improve handling of the spare tire 400 when this is stored in and removed from the tire storage unit 102.

The cable 23 connected to the terminal 22*a* of the speaker unit 1 is arranged along the inner surface of the tire storage unit 102.

Therefore, the cable 23 does not interfere with the spare tire 400 when the spare tire 400 is stored in or removed from the tire storage unit 102, so that the spare tire 400 may be smoothly stored in and removed from the tire storage unit 102 and the disconnection of the cable 23 may be prevented.

This Technology

This technology may have a following configuration.

(1) A speaker unit, comprising: a frame including an opening, a sound outputting unit arranged inside the frame, and an elastically deformable packing attached to the frame and projecting outward from the frame to be formed into an annular shape, the speaker unit configured to be stored in a tire storage unit including a storage concave portion opening upward in which a spare tire is stored in a state in which the packing is pressed against a rim portion of a wheel below a disk portion of the wheel of the spare tire.

(2) The speaker unit according to (1) described above, wherein the spare tire is configured to be stored in the tire storage unit in a state in which the disk portion of the wheel is located above a center in an axial direction of a tire tube.

(3) The speaker unit according to (1) or (2) described above, wherein the frame is formed of a first frame portion attached to the tire storage unit and a second frame portion located on a side opposite to the first frame portion in a vertical direction across the packing.

(4) The speaker unit according to (3) described above, wherein a fixing unit to fix the spare tire is provided on the frame.

(5) The speaker unit according to any one of (1) to (4) described above, wherein a cable for energizing the sound outputting unit is connected, and the cable is inserted through the opening to be arranged along an inner surface of the tire storage unit.

(6) The speaker unit according to (5) described above, wherein a groove portion is formed on the tire storage unit, and the cable is arranged in the groove portion.

Specific shape and structure of each unit described in the above-described best mode are merely an example of embodiments when carrying out this technology, and the technical scope of this technology cannot be interpreted in a limited manner according to them.

REFERENCE SIGNS LIST

1 Speaker unit
2 Frame
3 Sound outputting unit
4 Packing
5 First frame portion
6 Second frame portion
7*a* Threaded hole (fixing unit)
8*a* Opening
10*a* Opening
23 Cable
102 Tire storage unit
102*a* Storage concave portion
106 Groove portion
400 Spare tire
500 Wheel
501 Rim portion
502 Disk portion
600 Tire tube
400A Spare tire

The invention claimed is:

1. A speaker unit, comprising:
a frame including an opening;
a sound outputting unit arranged inside the frame; and
an elastically deformable packing attached to the frame and projecting outward from the frame to be formed into an annular shape,
the speaker unit configured to be stored in a tire storage unit including a storage concave portion opening upward in which a spare tire is stored in a state in which the packing is pressed against a rim portion of a wheel below a disk portion of the wheel of the spare tire.

2. The speaker unit according to claim 1,
wherein the spare tire is configured to be stored in the tire storage unit in a state in which the disk portion of the wheel is located above a center in an axial direction of a tire tube.

3. The speaker unit according to claim 1,
wherein the frame is formed of a first frame portion attached to the tire storage unit and a second frame portion located on a side opposite to the first frame portion in a vertical direction across the packing.

4. The speaker unit according to claim 3,
wherein a fixing unit to fix the spare tire is provided on the frame.

5. The speaker unit according to claim 1,
wherein a cable for energizing the sound outputting unit is connected, and
the cable is inserted through the opening to be arranged along an inner surface of the tire storage unit.

6. The speaker unit according to claim 5,
wherein a groove portion is formed on the tire storage unit, and
the cable is arranged in the groove portion.

* * * * *